Oct. 18, 1966  H. J. QUINSON  3,279,805
SEALING JOINT

Filed June 24, 1963  3 Sheets-Sheet 1

INVENTOR
Henry J. Quinson

By
Watson, Cole, Grindle & Watson
ATTORNEYS

Oct. 18, 1966  H. J. QUINSON  3,279,805
SEALING JOINT
Filed June 24, 1963  3 Sheets-Sheet 2
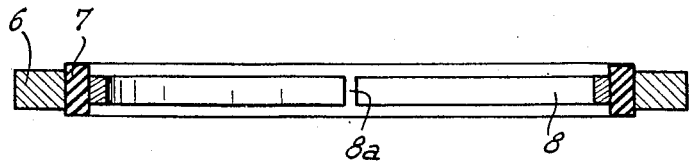
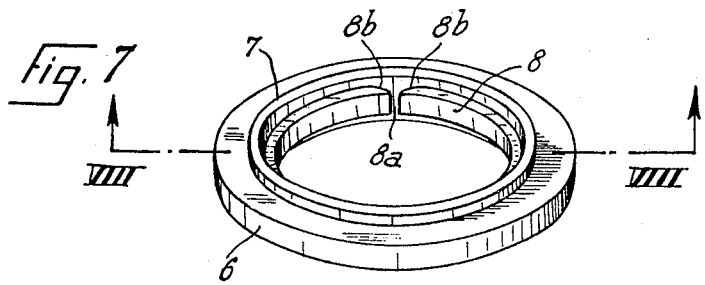
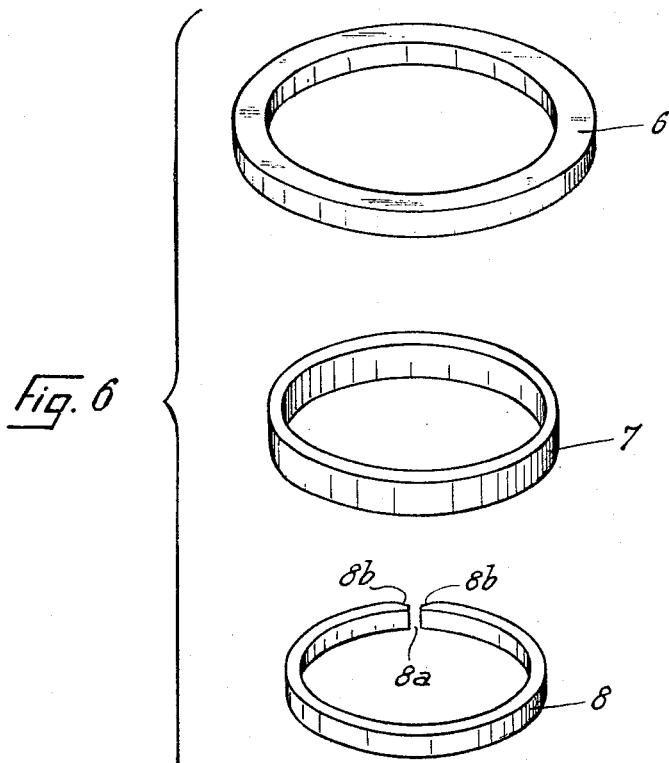
INVENTOR
Henry J. Quinson
By Watson, Cole, Grindle & Watson
ATTORNEYS

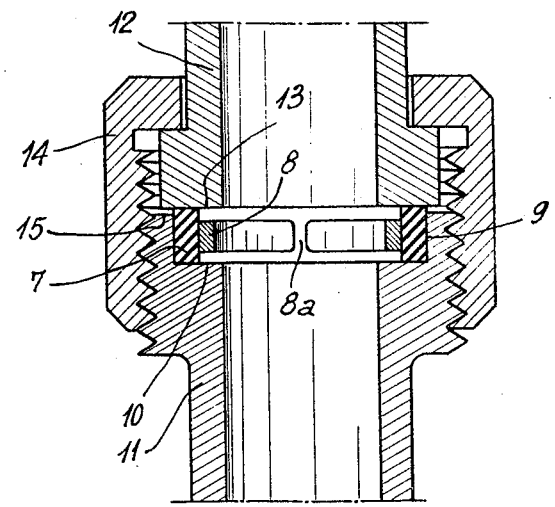
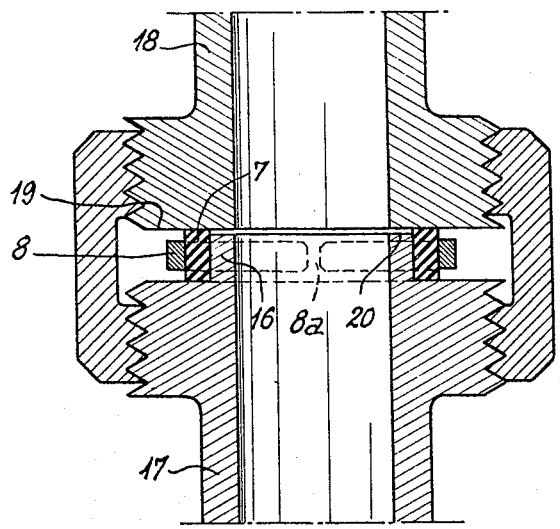

United States Patent Office 3,279,805
Patented Oct. 18, 1966

3,279,805
SEALING JOINT
Henry J. Quinson, 36 rue Victor Hugo,
Courbevoie, Seine, France
Filed June 24, 1963, Ser. No. 289,881
Claims priority, application France, Oct. 25, 1962,
913,378; 918,113; 926,758
1 Claim. (Cl. 277—162)

This invention concerns improvements in sealing joints.

The present invention relates to a sealing joint composed of two rings or washers, arranged concentrically, their respective diameters being such that a space exists between the two rings, this space being filled out with a packing made of rubber or of a similar material which is in intimate contact with the corresponding faces of the rings, the height of said packing being slightly greater than that of the rings so that the packing overlaps each plane surface of the rings.

The rings are preferably made of metal, an alloy or other material, having a sufficiently high resistance to compression which enables the joint to resist the pressure exerted thereon by an energetic tightening of the two parts between which the joint is fitted, while this pressure causes the flattening of those portions of the packing which overlap the plane surfaces of the rings, said packing thus forming an annular joint on each of said surfaces of the rings.

The joint thus formed has the advantage, when compared to joints which can be deformed by pressure, to allow the assembly of the parts between which it has been interposed to be tightened hard, the interval between the parts being determined by the thickness of the rigid rings.

According to another embodiment, the internal ring is constituted by an expansible metallic washer, acting to hold the packing against the internal face of the external ring without requiring special means for the fixation of said packing. This form of embodiment allows the low-cost manufacture of sealing joints, the three constituent elements having the form of annular elements, easy to obtain by the sectioning of tubes made of appropriate materials.

According to a modification, the ring which constitutes the bearing surface against which the packing is resiliently pressed is dispensed with and this bearing surface is then constituted by a support arranged on one of the parts to be joined.

The following description, with reference to the accompanying drawings, will explain how the invention can be put into effect, it being understood that both description and drawings are given by way of non-restrictive example.

FIGURE 6 is a separate and perspective view of the three elements of a joint constituted according to another embodiment.

FIGURE 7 is a perspective view of the joint obtained by the assembly of the three elements depicted in FIGURE 6.

FIGURE 8 is a transverse section, on an enlarged scale, along the line VIII—VIII of FIGURE 7.

FIGURE 9 shows a form of realisation of a modified joint according to the invention, in axial section, and FIGURE 10 illustrates an alternative form of this joint.

Figure 1:
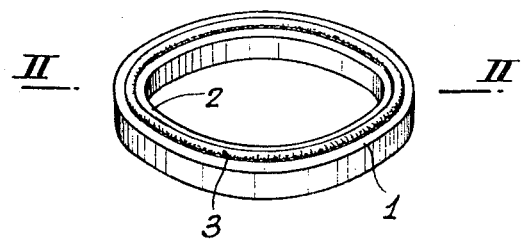
FIGURE 1 is a perspective view of a joint according to the invention.

The joint shown in FIGURE 1 is composed of two rigid rings 1 and 2, between which is fixed a packing 3 made of a flexible and elastic material.

The attachment of the packing 3 to each of the rings 1 and 2 can be effected by any known means.

Figure 2:
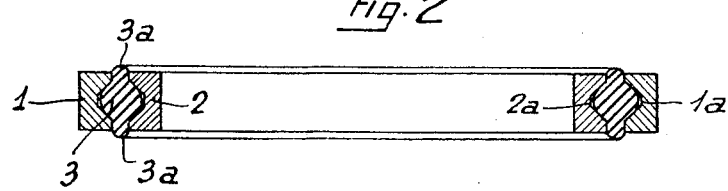
FIGURE 2 is a section along line II—II of FIGURE 1, on an enlarged scale.

To improve this attachment, it is advantageous to provide on the internal circumference of the ring 1 and on the external circumference of the ring 2 grooves 1a and 2a respectively (see FIGURE 2).

Figure 4:
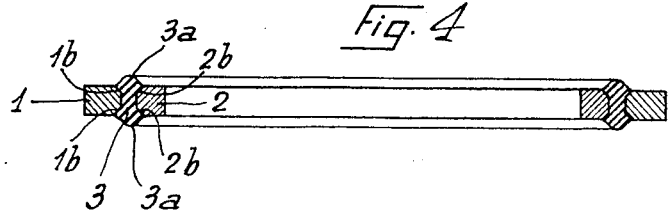
FIGURE 4 shows another manner of fixation of the packing between the rings.

To obtain the same effect and, by way of a modification, chamfers 1b and 2b can be provided on the internal periphery of ring 1 and on the external periphery of ring 2, as shown in FIGURE 4, which, in addition, illustrates a modified form of the rings 1 and 2.

The rings 1 and 2 are of equal thickness and the packing 3 is of such dimensions that it forms a slight circular projection 3a on each of the plane surfaces of the rings (FIGURE 2).

Figure 3:
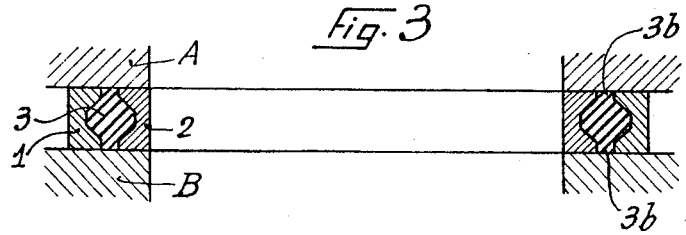
FIGURE 3 shows the elastic packing, flattened by tightening the joint between two parts.

When such a joint is clamped between two parts A and B (FIGURE 3), the circular projections 3a become flattened, constituting a sealing packing on each face of the joint, as shown in 3b.

The rings 1 and 2 act in the manner of a thick washer interposed between the parts A and B and thereby define the distance between said parts A and B. The latter can then be blocked in a well-defined position, without running the risk of subjecting the joint seal to an excessive deformation, as could happen with a joint seal of a conventional type.

The dimensions of the joint, namely the thickness of the rings 1 and 2, the extenral diameter of the ring 1 and the internal diameter of ring 2 can be the same as those of various standardised spacing washers.

The joint, with its inserted packing, is particularly suitable for use in assemblies in which the joint is positioned in the vicinity of screw threads.

Figure 5:
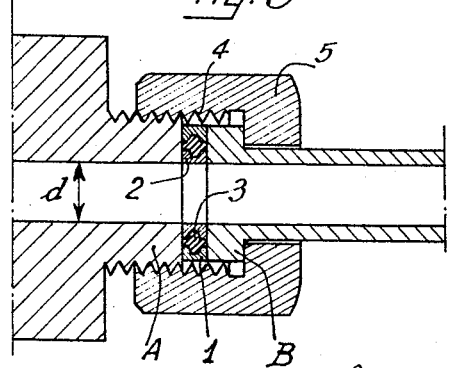
FIGURE 5 shows, by way of an explanatory example, an assembly employing a joint according to the invention.

Thus, in the case of an assembly such as illustrated in FIGURE 5, the joint is in contact with the screw thread 4 of the clamping nut 5 at the external face of the ring 1.

The parts A and B can be blocked in position by suitably tightening the nut 5 without risk that the joint interposed between said parts will be flattened and thus narrow the diameter $d$ of the fluid channel or that it will form a circular cavity at the joint, either of which would tend to interfere with the circulation of fluid in the channel.

In the embodiment illustrated in FIGURES 6–8, the external ring 6 has the form of a simple washer. The same applies to the elastic packing 7.

The thickness of said packing is slightly greater (by about 0.5 mm.) than that of the ring 6 so that, when said packing is engaged in the bore of the ring—the external diameter of the packing being equal to the internal diameter of the ring—the packing projects by about 0.25 mm. over each of the faces of ring 6.

In FIGURES 7 and 8, the projections formed by the packing 7 on the faces of ring 6 are exaggerated.

The packing 7 is held in place in ring 6 by means of an internal ring 8, open at 8a, this ring, made of steel for example, having an initial external diameter greater than the internal diameter of the packing 7, so that, by expansion of ring 8, the packing 7 is held in intimate contact with the internal face of ring 6.

The extremities 8b defining the opening 8a of the ring 8 are advantageously bevelled and rounded to avoid the risk of a deterioration of the packing 7 in the vicinity of the opening 8a.

The thickness of the internal ring 8 is at most equal to that of the external ring 6, but is preferably somewhat less.

The sealing joint realised according to the preceding description has the advantage, in addition to its low manufacturing cost, of being capable of resisting very high pressures.

It suffices—the resistance of the metal being the same—to give the external ring 6 appropriate dimensions to enable it to resist the pressure applied to the joint, the internal ring 8 being deformed under the effect of said pressure without reaching the breaking stress.

In the modification illustrated by FIGURES 9 and 10, the joints are assumed to be mounted between the ends of two pipes to be connected, but it is obvious that this is not a restrictive example.

By using the same references as those employed in FIGURES 6–8, the flexible and elastic packing is shown at 7 and the elastic ring at 8, open at 8a.

In the example illustrated in FIGURE 9, the contact surface of the packing 7, which, in the embodiment described in FIGURES 6–8 was constituted by the bore of the external ring 6 is formed, in this modification, by the bore 9 of a cavity or recess 10 provided on the end of the pipe 11.

The packing 7 rests with one of its faces against the bottom of the recess and is held in place by the elastic effect of the split ring 8.

The depth of the recess 10, i.e. the height of the wall 9 of the bore, is slightly smaller than the height of the packing 7, so that the latter projects over the plane of the end of the pipe 11.

The second pipe 12, to be joined to the pipe 11, terminates at its end in a flat face 13 held against the packing 7 by tightening a nut 14.

The flattening of the packing 7 is limited by the abutment of the face 13 against the end of the pipe 11, which corresponds to the clamping described above as resulting from the presence of the rigid rings 1 and 2 or at least of the external ring 6 between the pieces to be joined.

Naturally, the thickness of the collar 15 surrounding the recess 10 will be chosen sufficient to resist the pressure applied to the joint as described with reference to FIGURES 6–8, the mechanical strength of this collar being reinforced by the nut 14.

Instead of positioning the elastic ring 8 in the interior of the packing 7, as described with reference to FIGURES 6–8 and the FIGURE 9, the relative position of these two elements can be reversed as shown in FIGURE 10.

In this case, the contact surface of the packing 7 is constituted by the periphery of a collar 16, located at the end of a pipe 17, the ring 8 acting to press the packing resiliently against the collar 16 and to hold it in place thereon.

The height of this collar 16 is obviously—as in the case of wall 9—slightly smaller than the height of packing 7.

The flattening of packing 7 is limited by the end face 19 of the pipe 18 abutting against the end face 20 of the collar 16.

The embodiments illustrated in FIGURES 9 and 10 have the advantage, among others, of facilitating the joining of various pipes or other elements located at points difficult of access. The packing 7, being resiliently held in place on its contact surface, does not break away during handling of the pipe or other part to be joined.

It is obvious that the embodiments described herein can be modified, notably by the substitution of equivalent technical means, without thereby exceeding the scope of the present invention.

What I claim is:

A sealing joint forming an interchangeable assembly and comprising a resilient ring of rectangular cross section gripped between an outer rigid ring and an expandable inner ring, all of said rings being bounded by cylindrical coaxial surfaces and by plane surfaces perpendicular to the axis of said rings, said inner ring having an axial opening therein to permit expansion and contraction, the surface of said inner ring adjacent said resilient ring defining said opening being bevelled and rounded sufficient to prevent damage to said resilient ring, and said inner ring initially urging the resilient ring against the outer ring so that said resilient ring projects over each of the plane axial surfaces of the outer and inner rings, the axial thickness of the outer ring being slightly more than that of the inner expandable ring.

References Cited by the Examiner

UNITED STATES PATENTS

| | | | |
|---|---|---|---|
| 2,173,247 | 9/1939 | Bott | 277—162 |
| 2,722,043 | 11/1955 | Nenzell | 277—180 X |
| 2,840,262 | 6/1958 | Learmonth et al. | 277—188 X |
| 2,914,350 | 11/1959 | Smith | 277—180 X |
| 2,962,331 | 11/1960 | Folkerts | 277—157 X |
| 3,167,322 | 1/1965 | Aichroth | 277—180 |

FOREIGN PATENTS

| | | |
|---|---|---|
| 1,286,052 | 1/1961 | France. |
| 701,614 | 12/1953 | Great Britain. |
| 587,720 | 1/1959 | Italy. |
| 89,125 | 4/1937 | Sweden. |

SAMUEL ROTHBERG, *Primary Examiner.*